B. STAUFFER.
Lubricating Device.
No. 227,186.  Patented May 4, 1880.
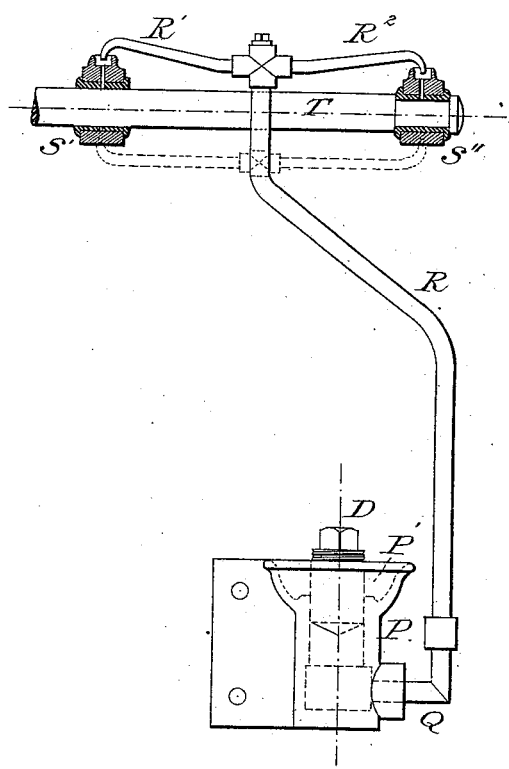

UNITED STATES PATENT OFFICE.

BERNHARD STAUFFER, OF COLOGNE, PRUSSIA, GERMANY.

LUBRICATING DEVICE.

SPECIFICATION forming part of Letters Patent No. 227,186, dated May 4, 1880.

Application filed February 23, 1878.

*To all whom it may concern:*

Be it known that I, BERNHARD STAUFFER, of Cologne, in the Kingdom of Prussia and Empire of Germany, have invented a new and useful Improvement in Lubricating Devices, of which the following is a specification.

This invention relates to improvements in that class of lubricators in which the lubricant is forced by a pressure-screw through tubes to journal-bearings difficult to reach and other parts of machinery which require lubricating, but which, owing to intermediate parts or the distance at which they are situated, the machinist or engineer finds it difficult or dangerous to obtain access to.

The object of my invention is to enable the lubricating-chamber to be replenished by the attendant when he discovers that it is nearly exhausted, and before removing the pressure-screw, so that afterward, by a simple movement of the pressure-screw, the lubricating matter can be brought under it. I thus avoid the delay which would ensue were the attendant compelled to refill the chamber only after the screw is raised.

The invention consists in providing the pressure-screw chamber with a cup or other supplementary receptacle or cavity surrounding the pressure-screw above the chamber for the reception of the additional supply of lubricating material, so that when the pressure-screw chamber becomes exhausted of the lubricant it can be refilled by withdrawing the pressure-screw from its chamber, which will allow the lubricant in the cup or receptacle above to flow down into the chamber.

The accompanying drawing represents, in side elevation, my improved lubricator, adapted to lubricate two distantly-placed shaft-bearings.

Referring to the drawing, P represents a cylindrical chamber for the reception of the lubricant. The chamber P is internally screw-threaded for the reception of a screw-plug, D, which screws easily in and out of the vessel, and serves as the pressure-screw of the lubricator. Above the cylindrical chamber is a conical or funnel-shaped cup or cavity, P', considerably larger than the chamber. The pressure-screw D is passed down through the cup or cavity P' and is screwed into the chamber P, whereby the cup or cavity P' is converted into an annular chamber surrounding the upper or handle part of the pressure-screw.

In the wall of the chamber P, at or near its bottom, is an opening, into which is entered the lower end of a tube, Q, so as to communicate with the interior of chamber P.

At the upper end of the tube Q is a T-pipe, R' R², with exit-openings at both ends, which exit-openings are, respectively, immediately over the cups of bearings S' S" of a shaft, T.

The lubricant is introduced into the chamber P, and the cup or cavity P' is partially filled, space enough only being left for the insertion of the pressure-screw D, which is screwed into the chamber P, and by pressing on the lubricant in the chamber P the lubricant is forced into pipe Q and up through the same into branch pipes R' R², and from these it is forced into the cups over the bearings S' S".

When the attendant discovers, by the action or by the position of the screw D, that the lubricant is nearly exhausted from the chamber P he withdraws the screw D from the chamber P. This allows the lubricant in the cup or cavity P' to run down into the chamber P and replenish it. The pressure-screw is now again entered into the chamber P and operated as before.

In this way, as will be readily understood by those whose duty it is to attend to the lubrication of machinery, the quantity of lubricating material in the chamber P can be ascertained directly by the action and position of the pressure-screw D; and also that, by means of the supplementary cup P' and the additional supply of lubricant which it contains, a means of quickly and easily refilling the chamber when exhausted is furnished, and the delay that would ensue had the can or other receptacle to be obtained will be avoided; also, in those cases where a constant lubrication is required, (as in screw-cutting machinery, for example,) and a stoppage of the supply would be injurious, the improvement is especially valuable, as the chamber P can be refilled instantaneously, and the pressure reapplied for forcing out the lubricant before the lubricant in the supply-tubes has time to flow back, whereas if the chamber had to be refilled from the outside the pressure-screw would have to be entirely withdrawn, the lubricant would have an opportunity to flow out of the tube, and in consequence there would be a complete stoppage of the supply of oil to the machinery.

The cup or cavity P' can be made of any desired capacity, so that a supply of lubricating material can be placed in it that will last many days.

I am aware that a lubricator has been patented for forcing the lubricant to the part to be lubricated by pressure; also, that a device has been patented for forcing the lubricant to mill-spindles from a convenient and easily-accessible point; but these I do not claim.

I claim—

As an improvement in lubricators, the cup or cavity P', in combination with the chamber P and pressure-screw D, the cup forming an annular chamber around the screw larger in diameter than said screw, substantially as herein shown and described.

This specification signed by me this 21st day of January, 1878.

B. STAUFFER.

Witnesses:
G. WOLF HARZ,
FRIEDRICH LASSE.